US012566334B2

(12) United States Patent
Rataj et al.

(10) Patent No.: US 12,566,334 B2
(45) Date of Patent: Mar. 3, 2026

(54) DEVICE FOR THE BEAM SHAPING OF AN INCIDENT LASER BEAM

(71) Applicants: TRUMPF Laser GmbH, Schramberg (DE); TRUMPF Photonics, Inc., Cranbury, NJ (US)

(72) Inventors: Thomas Rataj, Berlin (DE); Lukas Irmler, Constance (DE); Alexander Killi, Trossingen (DE); Steffen Ried, Rottweil (DE); Christoph Wieschendorf, Villingen-Schwenningen (DE)

(73) Assignees: TRUMPF PHOTONICS, INC., Cranbury, NJ (US); TRUMPF LASER GMBH, Schramberg (DE)

( * ) Notice: Subject to any disclaimer, the term of this patent is extended or adjusted under 35 U.S.C. 154(b) by 303 days.

(21) Appl. No.: 18/409,855

(22) Filed: Jan. 11, 2024

(65) Prior Publication Data

US 2024/0142785 A1 May 2, 2024

Related U.S. Application Data

(63) Continuation of application No. PCT/EP2022/068787, filed on Jul. 6, 2022.

(30) Foreign Application Priority Data

Jul. 13, 2021 (DE) .................... 10 2021 118 034.1

(51) Int. Cl.
*G02B 27/09* (2006.01)
*G02B 27/28* (2006.01)

(52) U.S. Cl.
CPC ..... *G02B 27/0916* (2013.01); *G02B 27/0905* (2013.01); *G02B 27/0972* (2013.01); *G02B 27/286* (2013.01)

(58) Field of Classification Search
CPC ............ G02B 27/0916; G02B 27/0905; G02B 27/0972; G02B 27/0927; G02B 27/286; G02B 27/09
See application file for complete search history.

(56) References Cited

U.S. PATENT DOCUMENTS

| | | | |
|---|---|---|---|
| 4,556,292 | A | 12/1985 | Mathyssek et al. |
| 5,101,393 | A | 3/1992 | Marshall |

(Continued)

FOREIGN PATENT DOCUMENTS

| | | |
|---|---|---|
| CN | 110456519 A | 11/2019 |
| DE | 10113019 A1 | 9/2002 |

(Continued)

OTHER PUBLICATIONS

Wikipedia post entitled "Brewster-Winkel", last edited Mar. 17, 2024, retrieved from internet at Brewster Angle—Wikipedia, the free encyclopedia, last accessed Apr. 22, 2024.

*Primary Examiner* — Jia X Pan
(74) *Attorney, Agent, or Firm* — LEYDIG, VOIT & MAYER, LTD.

(57) ABSTRACT

A device for beam shaping of a laser beam includes a prism, a polarization rotator, and a thin-film polarizer. The prism is configured to split an incident laser beam into a first beam half and a second beam half. The first beam half is input coupled into the prism. The first beam half enters the prism at a first incidence side arranged at the Brewster angle vis-à-vis the incident laser beam. The first beam half input coupled into the prism is output coupled from the prism at an exit side of the prism at the Brewster angle. The thin-film polarizer is traversed by the first beam half output coupled from the prism. The polarization rotator rotates a polarization of the second beam half. The second beam half is (Continued)

reflected by the thin-film polarizer. The thin-film polarizer superimposes the first beam half and the second beam half.

15 Claims, 12 Drawing Sheets

(56)                    References Cited

U.S. PATENT DOCUMENTS

| | | | |
|---|---|---|---|
| 5,557,475 | A | 9/1996 | Nightingale et al. |
| 6,441,960 | B1 | 8/2002 | Wang et al. |
| 6,680,800 | B1 | 1/2004 | Schreiber et al. |
| 7,529,021 | B2 * | 5/2009 | Nakae .................. H01S 5/2231 |
| | | | 359/333 |
| 2004/0091209 | A1 * | 5/2004 | Mikhailov ......... G02B 27/0972 |
| | | | 385/31 |
| 2004/0252744 | A1 * | 12/2004 | Anikitchev ........ G02B 19/0028 |
| | | | 372/100 |
| 2010/0097700 | A1 * | 4/2010 | Goldstein .......... G02B 19/0057 |
| | | | 359/485.07 |

FOREIGN PATENT DOCUMENTS

| | | | |
|---|---|---|---|
| EP | 0087101 | A1 | 8/1983 |
| JP | H10502746 | A | 3/1998 |
| WO | WO 0127686 | A1 | 4/2001 |
| WO | WO 2008156598 | A2 | 12/2008 |
| WO | WO 2020178564 | A1 | 9/2020 |

* cited by examiner

DEVICE FOR THE BEAM SHAPING OF AN INCIDENT LASER BEAM

CROSS REFERENCE TO RELATED APPLICATIONS

This application is a continuation of International Application No. PCT/EP2022/068787 (WO 2023/285250 A1), filed on Jul. 6, 2022, and claims benefit to German Patent Application No. DE 10 2021 118 034.1, filed on Jul. 13, 2021. The aforementioned applications are hereby incorporated by reference herein.

FIELD

Embodiments of the present invention relate to a device for the beam shaping of a laser beam.

BACKGROUND

For laser applications, there often is the desire to spatially decouple the creation of the laser beam from its actual application. The spatial decoupling may be desired for safety reasons, or because the ambient conditions prevailing in the area of the laser application, for example within the scope of material machining, may have an effect on the service life of the laser source. It is also possible that a single laser source is provided for supplying a plurality of machining stations.

Such decoupling and guidance of the laser beam is possible by means of optical fibers, wherein a laser beam can be input coupled into a flexible optical fiber and the latter can then be laid in a cable duct to the actual application location, for example in space-saving fashion. This applies in particular to high power lasers such as direct diode lasers or broad-stripe emitters of a diode laser since the laser powers occurring in that case cannot be guided in a free beam through the air for safety reasons. However, on account of their creation principle, such laser types have very unsymmetrical beam cross sections. In particular, they often have a significantly wider embodiment along a first beam cross section axis than along the respective other beam cross section axis. To input couple such a broadened laser beam into an optical fiber it is therefore necessary to compress the laser beam with as little loss as possible in terms of its beam cross section such that the resultant laser beam can subsequently be input coupled into an optical fiber by means of adjustment optics. Additionally, certain applications rely on the provision of a substantially rotationally symmetric beam cross section.

WO2008/156598A2 discloses a device for increasing the laser intensity and for beam shaping. In that case, the laser beam is split into two component beams, wherein the first beam traverses a polarization rotator and is subsequently superimposed on the second component beam in a beam splitter, in such a way that the beam cross section of the emergent laser beam is smaller. DE10113019A1 discloses such a beam shaping device, in which the beam superposition is implemented by means of a polarizing beam splitter cube, as well.

A disadvantage of these apparatuses lies in their mechanical stability, which is a precondition for safe operation, especially at high laser powers. For instance, the adhesive holding together the prisms in beam splitter cubes may melt under high laser power. Moreover, the coated faces in the beam path reduce the efficiency of the system.

SUMMARY

Embodiments of the present invention provide a device for beam shaping of a laser beam. The device includes a prism, a polarization rotator, and a thin-film polarizer. The prism is arranged such that it splits an incident laser beam into a first beam half and a second beam half. At least the first beam half is input coupled into the prism. The first beam half enters the prism at a first incidence side. The prism is configured such that the first incidence side is arranged at the Brewster angle vis-à-vis the incident laser beam. The prism is configured such that the first beam half input coupled into the prism is output coupled from the prism at an exit side of the prism. The first beam half is output coupled from the prism at the Brewster angle. The thin-film polarizer is arranged such that it is traversed by the first beam half output coupled from the prism. The polarization rotator is arranged such that it is traversed by the second beam half and rotates a polarization of the second beam half. The second beam half is guided such that it is reflected by the thin-film polarizer. The thin-film polarizer superimposes the first beam half and the second beam half.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

Figure 1B:
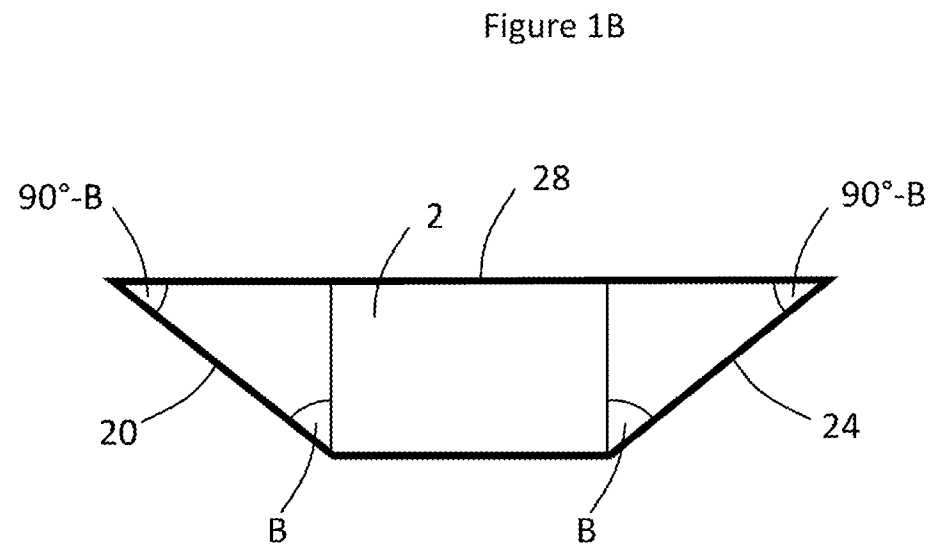

FIG. 1B shows a schematic illustration of the prism of the first embodiment;

DETAILED DESCRIPTION

Figure 1A:
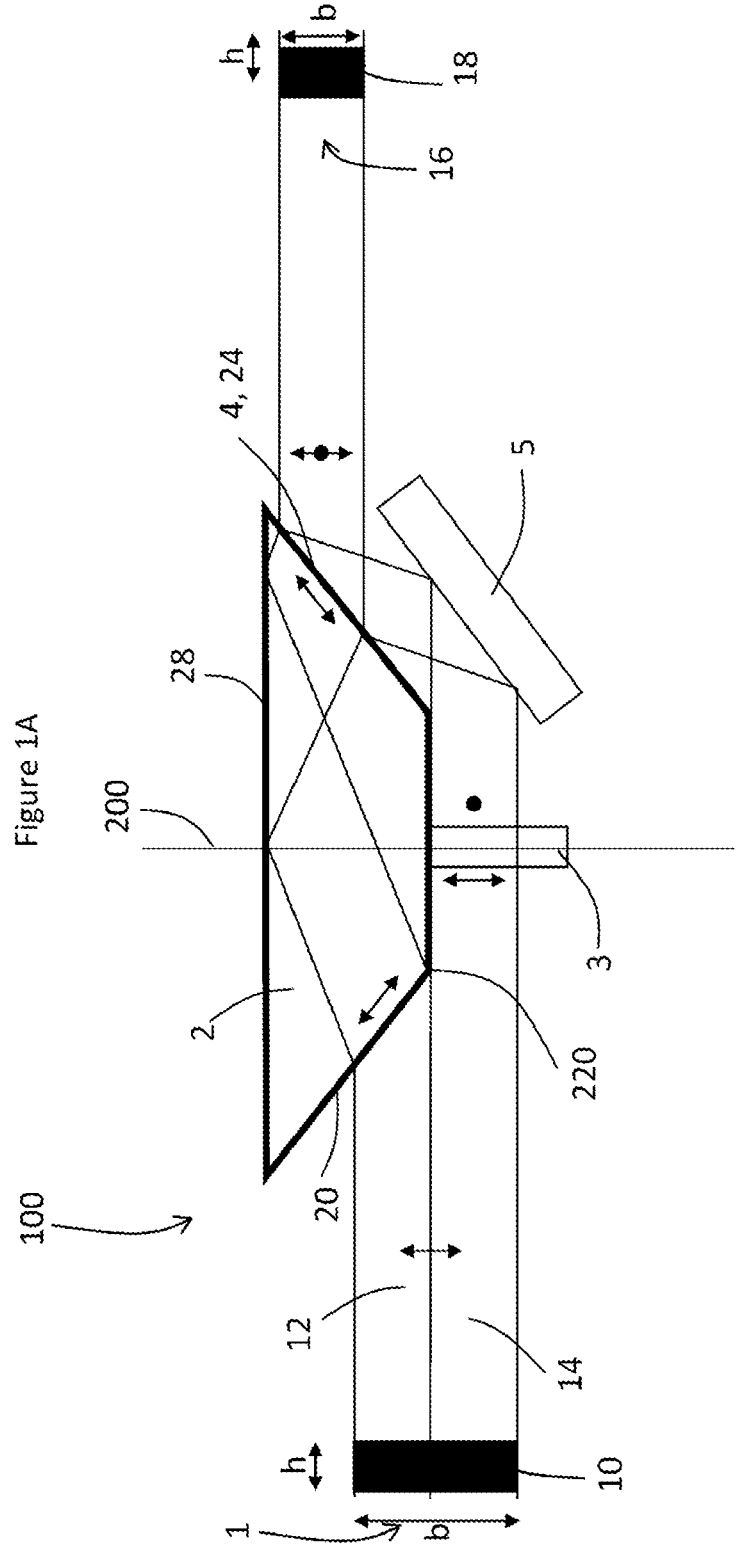
FIG. 1A shows a schematic illustration of a device for beam shaping according to a first embodiment, and of the beam path through this device.
Figure 1C:
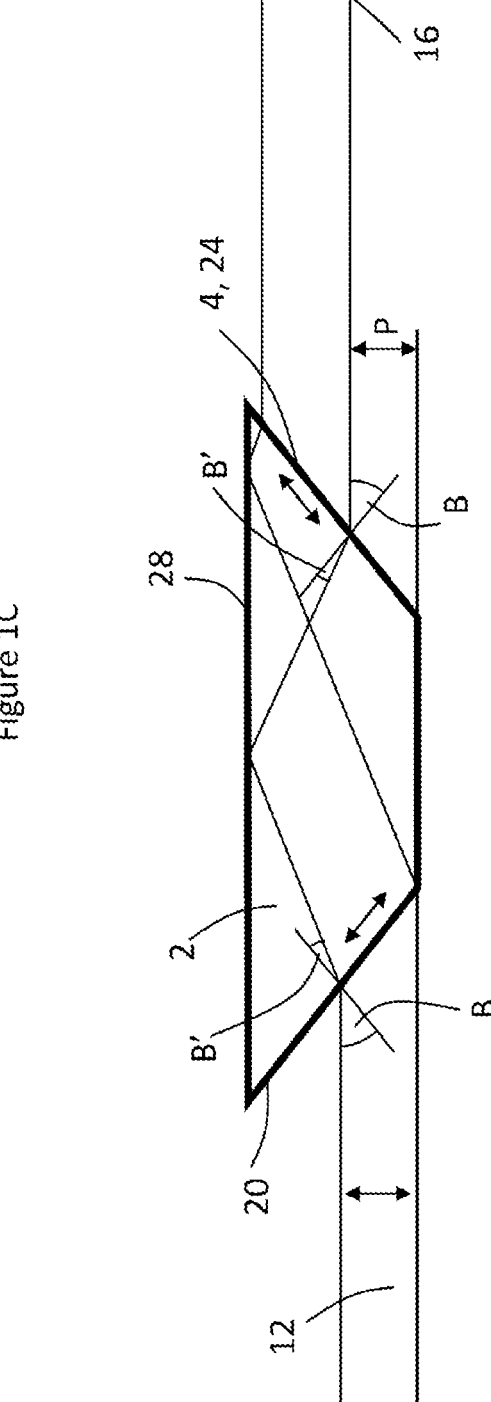
FIG. 1C shows a schematic illustration of the beam path of the first beam half through the prism of the first embodiment.
Figure 1D:
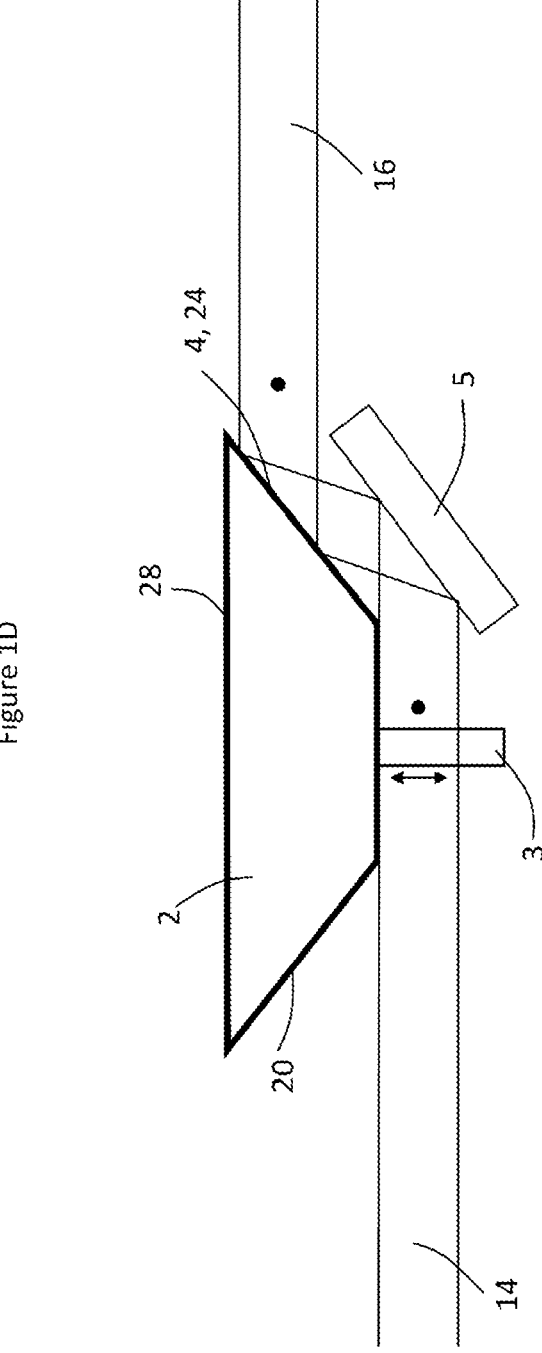
FIG. 1D shows a schematic illustration of the beam path of the second beam half through the prism of the first embodiment.

Embodiments of the present invention provide an improved device for beam shaping.

According to some embodiments, a device for the beam shaping of a laser beam, comprising a prism, a polarization rotator, and a thin-film polarizer, is proposed. In this case, the prism is arranged such that it splits an incident laser beam into a first beam half and a second beam half, with at least the first beam half being input coupled into the prism. Further, the first beam half enters the prism at a first incidence side, with the prism being designed such that the first incidence side is arranged at the Brewster angle vis-à-vis the incident laser beam, and the prism being designed such that the first beam half input coupled into the prism is output coupled from the prism again at an exit side of the prism, with the first beam half being output coupled from the prism at the Brewster angle, with the thin-film polarizer being arranged such that it is traversed by the first beam half output coupled from the prism. In this case, the polarization rotator is arranged such that it is traversed by the second beam half and rotates the polarization of the second beam half, the second beam half being guided such that it is reflected by the thin-film polarizer, and the thin-film polarizer superimposes the first beam half and the second beam half.

In this context, beam shaping is understood to mean that, inter alia, the beam cross section of the laser beam is modified. The beam cross section is the area assumed by the laser beam perpendicular to its propagation direction. In particular, beam shaping is understood here to mean that the beam cross section is reduced, in particular halved, or that the aspect ratio of the beam cross section is adapted. If the beam cross section is greater along one axis than the other, then a reduction in the beam cross section can for example be achieved by reducing the length of the long axis.

For example, the incident laser beam may originate from a broad-stripe emitter of a diode laser. Such an emitter typically has a significantly poorer beam quality along one axis (slow axis) than the other axis (fast axis). In particular, a poorer beam quality of a broad-stripe emitter collimated along both axes means that the beam cross section along the slow axis is significantly larger than along the fast axis.

However, the incident laser beam may also originate from a direct diode laser, which combines the radiation of a plurality of bars by wavelength multiplexing to form a beam. In this case, each bar consists of several individual emitters. In this case, the geometric shape of the individual emitters on the bars and the arrangement of the bars define, inter alia, the beam cross section of the direct diode laser which, in particular, may be significantly longer along one axis than along another axis.

Independently of the embodiment of the laser, the incident laser beam provided is preferably p-polarized. This can be achieved by virtue of the incident laser beam either already being p-polarized on account of the way it was created or being converted into a p-polarized state using suitable means.

The prism used is a three-dimensional optical component which is transparent to the incident laser beam and has a geometric shape. The prism preferably consists of glass, for instance fused silica or borosilicate. However, it may also be manufactured from various optical crystals, for instance quartz or sapphire. The material of the prism has a wavelength-dependent refractive index which differs significantly from the medium surrounding the prism. For example, the surrounding medium can be air or a vacuum. In particular, this determines reflection and transmission when light from the surrounding medium transitions into the prism, and when light from the prism transitions into the surrounding medium. In particular, the refractive indices of the prism $(n_2)$ and surrounding medium $(n_1)$ define the Brewster angle according to: $B=\arctan(n_2/n_1)$. Moreover, Snell's law can be used to derive the angle $B'=\arcsin(n_1 \cdot \sin(B)/n_2)$ of the refracted beam in the interior of the prism and a minimum angle $B''>\arcsin(n_2/n_1)$ at which total-internal reflection occurs at boundaries in the interior of the prism.

The prism has various plane faces that are in each case arranged at angles with respect to one another. The angle at which the sides of the prism are arranged with respect to one another can be derived from the Brewster angle using the following equation: $90°-B$. Consequently, a beam parallel to the prism base is incident on a first incidence side at the Brewster angle and likewise emerges from the exit side again at the Brewster angle.

In this case, the incident laser beam is directed at an edge of the prism such that the edge of the prism splits the beam cross section into a first beam half and a second beam half and for example halves the incident laser beam.

At least the first beam half then enters the prism. If both beam halves enter into the prism, then the first beam half is the half which traverses the thin-film polarizer further down its beam path.

The first incidence side of the prism is the side of the prism through which the first beam half enters the prism.

An incidence plane is defined as the plane which the normal of the first incidence side takes up with the incident laser beam.

The polarization of the laser beam is given by the direction of the electric field of the light of the laser beam. Accordingly, p-polarization is present if the electric field of the light is located in the incidence plane. s-polarization is present if the electric field of the light is located perpendicular to the incidence plane.

The first incidence side of the prism is aligned such that the first beam half is incident on the incidence side of the prism at the Brewster angle and hence subsequently enters the prism substantially without losses.

The Brewster angle is defined as the angle of incidence of the light on a prism side, at which the s-polarized light is reflected by the prism during the transition from the surrounding medium but the p-polarized light is able to enter the prism.

Additionally, the Brewster angle always relates to the surface normal (the normal) of the side on which the respective beam half is incident or from which the beam half emerges. The Brewster angle can be defined analogously for a transition from a prism to the surrounding medium.

For example, if p-polarized light is incident on a prism side at the Brewster angle, then it is refracted into the prism in full. In particular, this may mean that the transition of the light between the surrounding medium and the prism is not accompanied by a loss of laser power in this case.

By contrast, if s-polarized light is incident on a prism side at the Brewster angle, then it is partly transmitted into the prism and partly reflected. Consequently, the s-polarized light can only be input coupled into the prism with a loss of laser power.

For example, only the s-polarized light is reflected if unpolarized light is incident on a prism side at the Brewster angle, and so the reflected beam is linearly s-polarized. By contrast, the transmitted beam is p-polarized. Consequently it is possible to split light according to its polarization.

In particular, the incident laser light is preferably already p-polarized so that it can enter the prism without losses.

The first beam half traverses the prism. In the process, there may be at least one reflection within the prism. In particular, the prism can be designed such that the first beam half undergoes total-internal reflection within the prism and finally reaches the first exit side of the prism.

In this case, the first exit side of the prism can be arranged in the prism such that there is a parallel offset between the emerging first beam half and the incident laser beam.

In this case, parallel offset is understood to mean that the emerging laser beam is displaced by a distance vis-à-vis the laser beam entering the prism. In this case, the propagation directions of the entering and emerging laser beam are the same. In particular, the parallel offset of a laser beam has no influence or only a small influence on the polarization and energy content of the laser beam.

The output coupled first beam half is subsequently guided through a thin-film polarizer.

So-called thin-film polarizers (TFPs) are optical components which use the Brewster angle to split the polarizations of light into p-polarization and s-polarization. For example, a thin-film polarizer can be set up as a plane-parallel plate, which is introduced into the beam path of a laser beam. If light is incident on the plane-parallel plate at the Brewster angle, it is split into its p-polarized and s-polarized components according to the aforementioned principle.

In particular, the thin-film polarizer can be coated with an optical coating. As a result thereof, the Brewster condition can be fulfilled over an angular range and hence not only for exactly one angle. Individual surfaces or all surfaces of the prism may also have such a coating. A prism side having such an optical coating can likewise have the properties of a thin-film polarizer, with the result that a prism side prepared thus should likewise be understood to be a thin-film polarizer.

In particular, a thin-film polarizer can be used to superimpose p-polarized and s-polarized components. To this end, p-polarized light can be transmitted through the TFP, while the s-polarized light is reflected at the opposite side of the TFP. In this case, care needs to be taken that the parallel offset, which occurs during the transmission of the p-polarized light in the TFP, might possibly have to be compensated for.

Since the light of the emerging first beam half is p-polarized, it can pass the thin-film polarizer without loss.

Following the split, the second beam half traverses a polarization rotator.

A polarization rotator is understood to mean an optical component which can rotate the polarization of light through a certain angle during the traversal of the polarization rotator. Such a polarization rotator typically comprises a birefringent crystal of suitable thickness and alignment. However, other optical materials with this property can also be used.

Moreover, the assumption is made below that the light entering the polarization rotator maintains its propagation direction upon emergence. However, should the propagation direction of the light nevertheless be changed, a suitable combination of mirrors and lenses can be used to realign the output coupled light in parallel with the entering light.

For example, the polarization of the second beam half can be rotated through 45° such that the second beam half is partially p-polarized and partially s-polarized.

After the second beam half has traversed the polarization rotator, it is reflected by the thin-film polarizer and consequently superimposed with the first beam half.

For example, this may mean that the second beam half has a partial s-polarization and is incident on the thin-film polarizer at any desired angle, with the result that both the s-polarized light and the p-polarized light is partially reflected at the thin-film polarizer and partially transmitted through the thin-film polarizer. In particular, the second beam half can also be reflected on the thin-film polarizer at the Brewster angle, with the result that only the s-polarized light is reflected and the p-polarized light is transmitted.

Moreover, the second beam half is incident on the thin-film polarizer at such an angle that the reflected beam is subsequently parallel to the transmitted beam of the p-polarized first beam half.

In particular, the second beam half can be reflected by the thin-film polarizer in such a way that the first and second beam halves superimpose.

The first and the second beam halves are superimposed in this way, with the result that the beam cross section is reduced.

In other words, the incident laser beam is split into two beam halves and the two beam halves are then superimposed such that the beam cross section is reduced accordingly.

The first exit side can be at the Brewster angle with respect to the first beam half which is input coupled into the prism and incident on the first exit side, wherein the thin-film polarizer is arranged such that it is traversed at the Brewster angle by the first beam half output coupled from the prism.

This is advantageous in that the transmission through the prism and the thin-film polarizer is high.

The polarization rotator can preferably be attached to the prism and/or be a half-wave plate. This allows a compact set up to be realized.

An advantage thereof is that the installation space of the optical components can be minimized. Moreover, as a result, the light beam output coupled has the same alignment as the incident light beam, with the result that further optical components can be dispensed with.

For example, attaching the polarization rotator to the prism may mean that the polarization rotator is screwed onto or adhesively bonded to the prism. However, the polarization rotator may also be introduced into a groove in the prism. In this case, the polarization rotator may still project beyond the prism side in which it has been introduced.

An advantage thereof is that installation space can be economized. Moreover, this enables a mechanically more stable connection between the various optical components.

The polarization rotator is preferably designed such that the polarization of the second beam half is rotated through 90°, preferably rotated into an s-polarization.

What can be achieved as a result is that the second beam half can be reflected in full at the thin-film polarizer provided it is incident on the thin-film polarizer at the Brewster angle.

Preferably, the prism can be designed such that at least one of the beam halves undergoes total-internal reflection within the prism. This may mean that the directional change created by the total-internal reflection of the beam half causes the first beam half to be incident on an exit face of the prism at a preferred angle.

This may also mean that the directional change caused by the total-internal reflection causes the second beam half to be incident on the prism base of the prism at a preferred angle. In this case, the prism base is the side face of the prism where the second beam half undergoes total-internal reflection.

The prism base need not run parallel to the incident laser beam but may be at an angle vis-à-vis the latter. In particular, this may mean that a significantly angled prism base yields a long beam propagation time in the prism. In particular, this should be understood to mean that when the prism base is angled the length of the prism needs to be chosen such that the beam does not emerge from the prism before an instance of total-internal reflection has occurred.

This is advantageous in that the directions of the first and second beam halves in the prism can be modified without loss of power.

Preferably, at least one mirror is provided, the latter reflecting the second beam half, following its traversal of the polarization rotator, at the thin-film polarizer.

In this case, at least one mirror can be used to reflect the beam path of the second beam half at the thin-film polarizer in such a way that the second beam half reflected by the thin-film polarizer overlaps with the first beam half transmitted through the thin-film polarizer.

Preferably, the mirror or mirrors and the prism are pre-assembled on a common base plate. This can be used to increase the mechanical stability of the entire optical device.

Preferably, the prism is arranged and designed such that the second beam half is input coupled into the prism at a second incidence side, the second incidence side being arranged at the Brewster angle vis-à-vis the incident laser beam.

The second beam half is also input coupled into the prism in full as a result. Moreover, the first and the second beam halves are diverted to different optical paths within the prism, with the result that the further beam shaping can be implemented by way of the geometry of the prism.

As a result, it is also possible to reduce the optical adjustment outlay and increase the mechanical stability and alignment of the two component beams.

In this context, the prism can further be designed such that the second beam half is output coupled from the prism at a second exit side, the second exit side being arranged such that the second beam half is incident on the second exit side at the Brewster angle.

In this case, the second exit side is the side face of the prism from which the second beam half is output coupled. Hence, a p-polarized second beam half can be output coupled from the prism in full.

In this case, the second exit face of the prism can be attached to the prism base at an angle X. The angle X varies with the angle of the prism base with respect to the incident laser beam, and with the angle of total-internal reflection. Hence, no energy is lost for the superimposed beam.

Preferably, the polarization rotator is arranged such that the second beam half output coupled from the prism traverses the polarization rotator. In particular, the polarizer can be attached directly behind the second exit side in this case. This can control the efficiency of the reflection at the thin film polarizer.

However, the second beam half need not enter the prism but may also be guided past the prism. As a result thereof, additional optical components can be introduced into the beam path of the second beam half in order to be able to optimize the beam path and the properties of the second beam half more easily.

Preferably, a thin-film polarizer on the first exit side of the prism can be implemented by a suitable optical coating.

No additional optical component is required as a result. Moreover, this can improve the mechanical stability of the set up. As a result of a suitable broadband coating it is possible that each angle over a certain angular range has the effect of the Brewster angle on the first and second beam half.

The prism can be a Dove prism. A Dove prism is understood to mean a prism with a trapezoidal base area. In particular, the sides of the trapezoid can be arranged such that the first beam half enters the prism at the Brewster angle, thereafter undergoes total-internal reflection at the prism base, and subsequently strikes the first exit side at the Brewster angle.

This yields a simple geometric shape sufficient to put the first beam half and the second beam half on different beam paths and process these independently of one another.

The aforementioned object is also achieved by a method for the beam shaping of a laser beam having the features of claim 14. Advantageous developments are evident from the present description and the figures.

Accordingly, a method for the beam shaping of a laser beam using a device is proposed, wherein the device comprises a prism, a polarization rotator, and a thin-film polarizer. In this case, the incident laser beam is divided into a first beam half and a second beam half as a result of striking the prism, wherein the first beam half is incident on a first incidence side of the prism at the Brewster angle, then enters the prism, traverses the prism, and strikes a first exit side at the Brewster angle and exits the prism, wherein, following the traversal of the prism, the first beam half has a parallel offset from the incident laser beam. Furthermore, following the exit from the prism, the first beam half traverses a thin-film polarizer, and the polarization of the second beam half is rotated by the polarization rotator, wherein the second beam half is deflected in the direction of the thin-film polarizer by refraction and/or reflection. Furthermore, the second beam half is reflected by the thin-film polarizer, and the first beam half and the second beam half are congruently superimposed downstream of the thin-film polarizer in the beam direction.

Preferred exemplary embodiments are described below with reference to the figures. In this case, elements that are the same, similar or have the same effect are provided with identical reference designations in the different figures, and a repeated description of these elements is omitted in some instances, in order to avoid redundancies.

FIG. 1, comprising FIGS. 1A, 1B, 1C, 1D, schematically shows an embodiment of a device 100 for beam shaping of a schematically indicated laser beam 1. The laser source is not shown here; instead, the laser beam 1 is considered independently of the creation thereof.

For example, the laser beam 1 can be provided by means of a direct diode laser or a broad-stripe emitter and has a non-rotationally symmetric profile. In particular, on account of the characteristic of its source, the laser beam 1 has a substantially rectangular beam cross section 10, which has a greater width b than its height h.

This beam cross section 10 of the laser beam 1 is indicated schematically in FIG. 1A, wherein the width dimension b of the beam cross section 10 is in the plane of the paper and the height dimension h is accordingly perpendicular to the plane of the paper.

In the embodiment shown, the device 100 for beam shaping comprises a prism 2, a polarization rotator 3, a thin-film polarizer 4, and a mirror 5.

In this case, the laser beam 1 provided is p-polarized in relation to the boundary of the prism 2. This p-polarization can be obtained by appropriate optical measures prior to the entry into the device 100 for beam shaping, for example by processing the laser beam by means of a birefringent crystal or a quarter wave plate.

The prism 2 used in the embodiment shown has a sub-stantially mirror symmetric structure in relation to a center plane 200 and in principle has the structure of a Dove prism. This prism is shown in detail in FIG. 1B. In comparison with a conventional Dove prism, in which the side faces are usually arranged at an angle of 45°, however, the side faces of the proposed prism 2 are arranged at an angle which in each case corresponds to the Brewster angle in relation to the incident laser beam 1 and in relation to the emerging laser beam. In the exemplary embodiment shown, this corresponds to an angle of 55.42°. The refractive index of the prism is wavelength dependent, and so the Brewster angle is also different for different wavelengths.

Figure 1E:
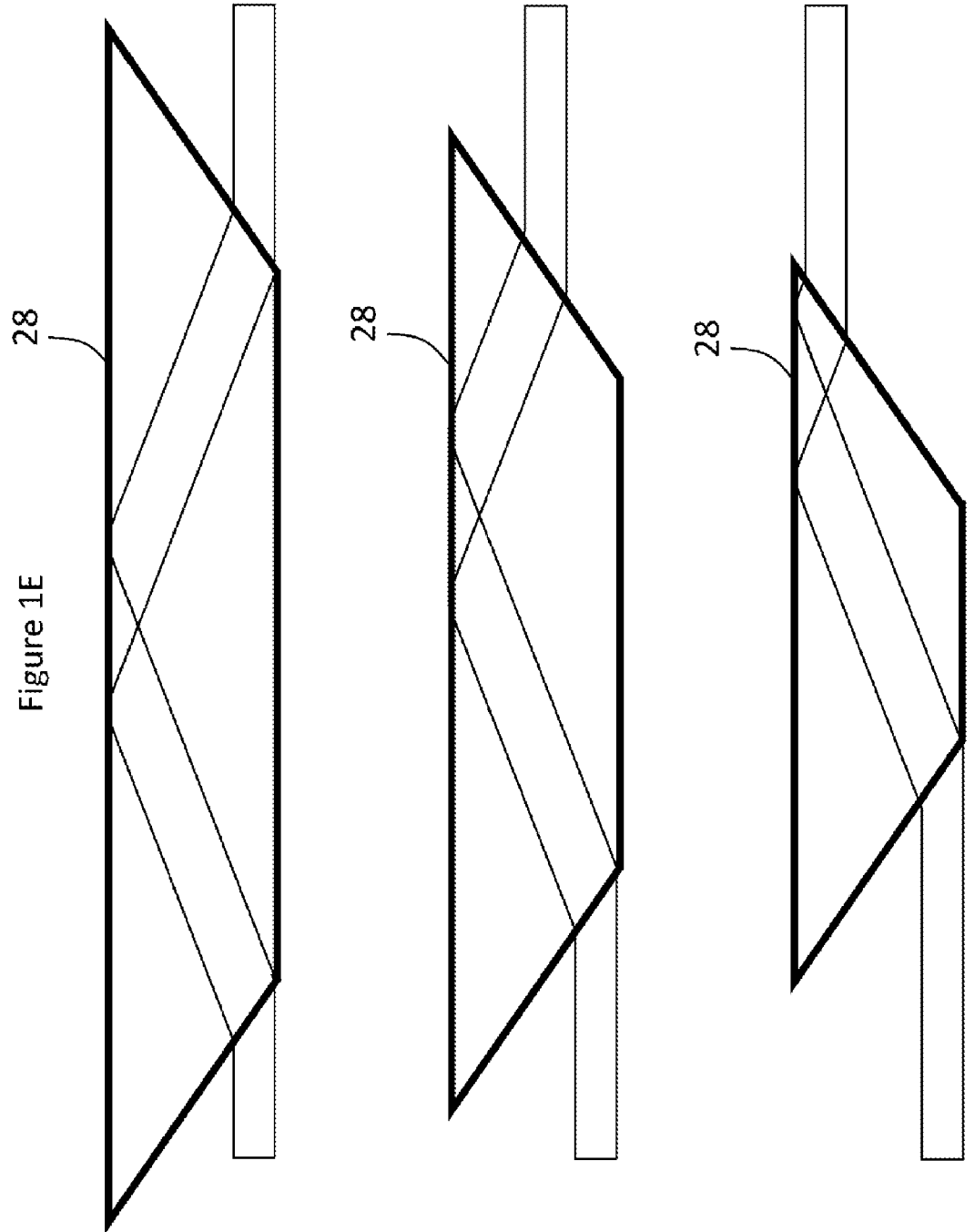
FIG. 1E shows a schematic illustration of the entrance and exit angles dependent on the length of the prism base, according to some embodiments.
Figure 2A:
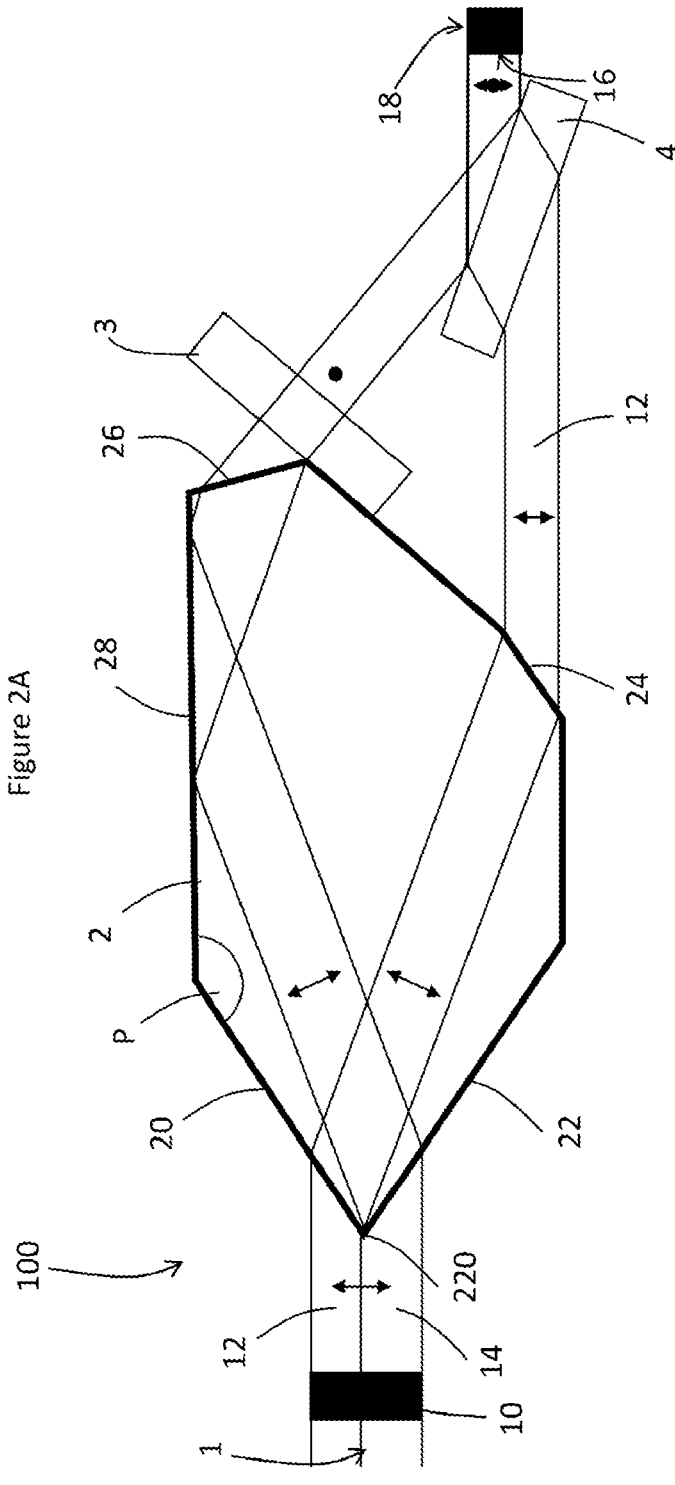
FIG. 2A shows a schematic illustration of a further device for beam shaping, and of the beam path through the device, according to some embodiments.
Figure 2B:
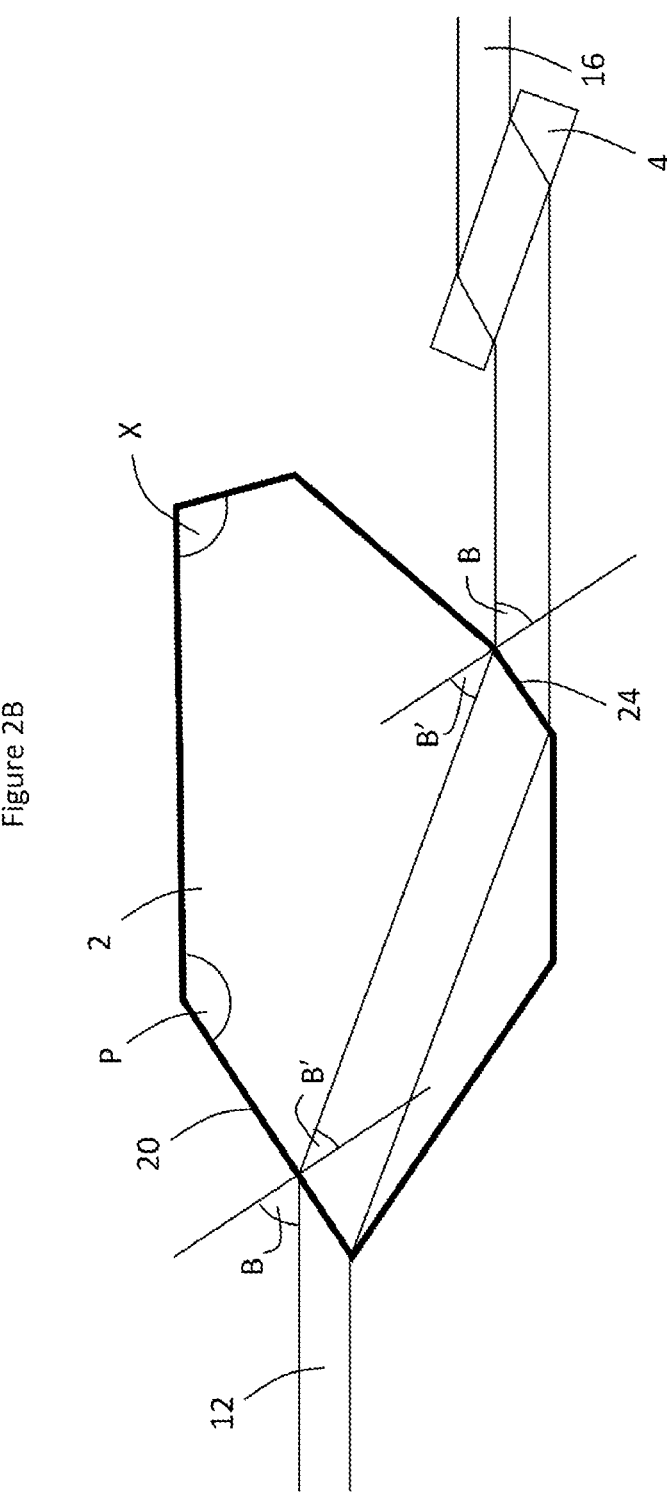
FIG. 2B shows a schematic illustration of the beam path of the first beam half through the prism of the further embodiment.
Figure 2C:
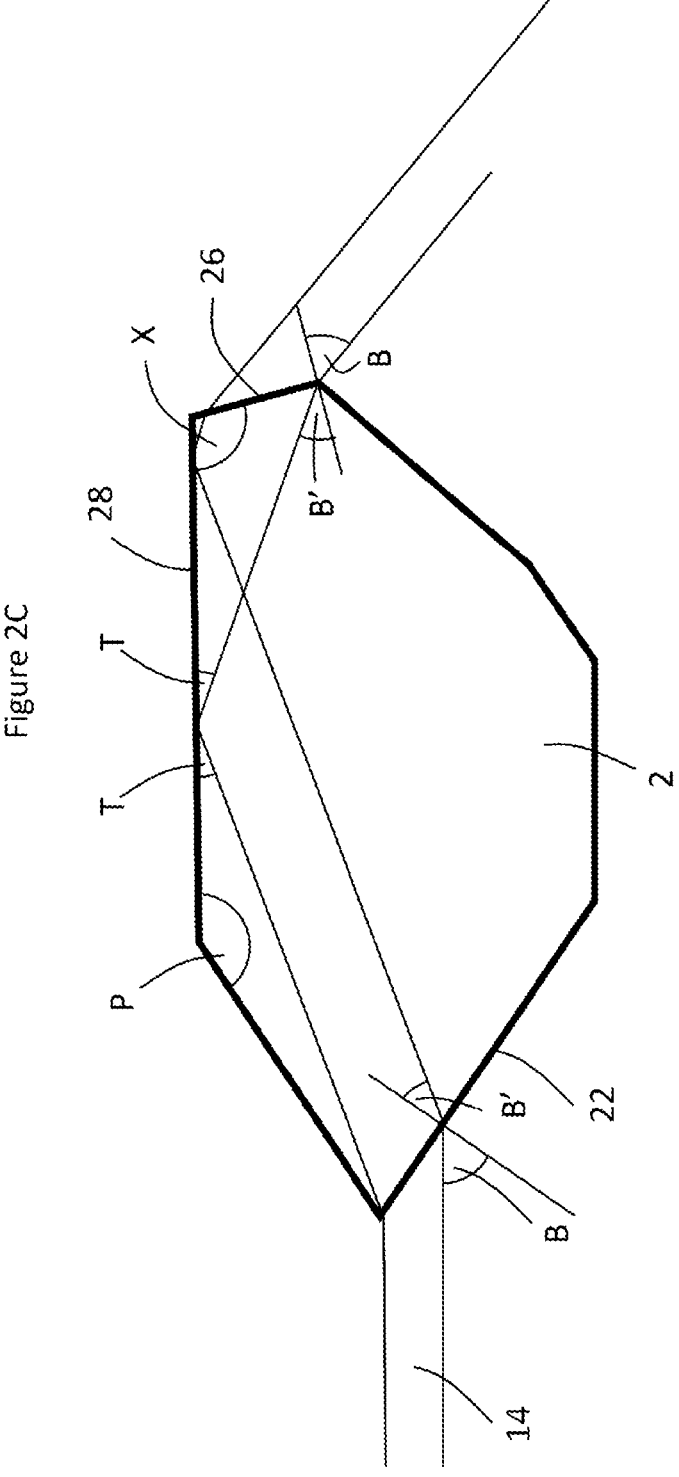
FIG. 2C shows a schematic illustration of the beam path of the second beam half through the prism of the further embodiment.
Figure 2D:
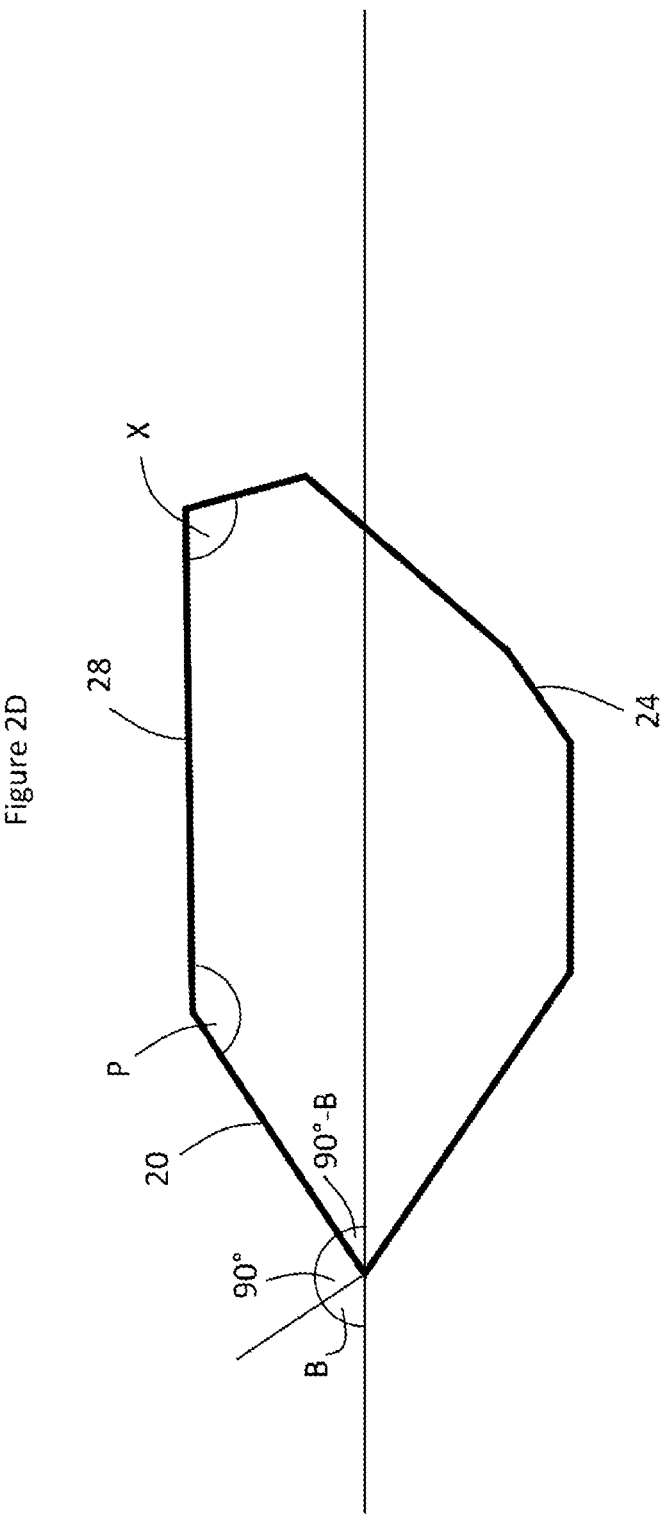
FIG. 2D shows a schematic illustration of geometry of the prism of the further embodiment.

The prism 2 has a corresponding geometric design such that the entrance side 20 includes an angle B with the prism base 28 and the exit side 24 includes an angle B' with the prism base 28. The angle B of the entrance side 20 corresponds to the Brewster angle for the laser beam 1 incident parallel to the prism base 28. The angle B' of the refracted beam on the exit side 24 corresponds to the angle B' of the laser beam emerging from the prism 2. Typically, the refractive index in the glass is 1.45 (but 1 in air), and so B and B' are different. By lengthening the prism base 28 it is possible to modify the propagation path within the prism and hence the exit position on the exit side 24. However, the exit angles are maintained in the process, as shown in FIG. 1E.

The incident laser beam 1 is p-polarized, indicated by the double-headed arrows in the plane of the sheet. In relation to the prism 2, the incident laser beam 1 is aligned such that it is incident on an edge 220 of the prism 2 such that the incident laser beam 1 is split into a first beam half 12 and a second beam half 14. As a result, both beam halves in each case only still comprise half of the beam cross section 16 of the incident laser beam 1. The incident laser beam 1 is split exactly in half in the present example.

The first beam half 12 is incident on the first prism side 20 at the Brewster angle B. Since the first beam half 12 is p-polarized, it is input coupled into the prism 2 without energy losses and reflection losses. The first beam half 12 traverses the prism 2 and undergoes total-internal reflection at the prism base 28 on account of the suitably chosen geometry of the prism 2. Thus, the propagation direction of the first beam half 12 is changed within the prism, without energy losses or reflection losses.

Subsequently, the first beam half 12 is incident on the first exit side 24 at the angle B'. In this context, it should be noted that the Brewster angle B applies during the transition from the surrounding medium into the prism 2, whereas the angle B' of the refracted beam arising therefrom applies during the reverse transition.

An optical coating has been applied to the exit side 24 so that this side acts as a thin-film polarizer 4. The p-polarized first beam half 12 can traverse the thin-film polarizer 4 unimpeded as the latter allows a 100% transmission for this polarization. The first beam half 12 that has emerged from the prism 2 in this case has a parallel offset P with respect to the entering first beam half 12.

In this exemplary embodiment, the second beam half 14 is guided past the prism 2 and traverses a polarization rotator 3 adjacent to the prism 2. In this case, the polarization rotator 3 is provided in the form of a half-wave plate, which rotates the polarization of the second beam half 14 through 90°. Hence, the second beam half 14 is s-polarized following the traversal of the polarization rotator 3; this is indicated by the black dot.

The s-polarized second beam half 14 is incident on a mirror 5. In terms of its position and its angle, the mirror 5 is set such that the second beam half 14 is incident on the thin-film polarizer 4 implemented by the optical coating on the exit side 24 of the prism 2 at the Brewster angle B. For this polarization, the thin-film polarizer 4 exhibits a reflection of virtually 100 percent, for example a reflection of more than 90 percent, with the result that the s-polarized second beam half 14 is accordingly reflected in full at the thin-film polarizer 4 arranged on the exit side 4 of the prism 2.

Further, the position and the angle of the mirror 5 are further set such that the second beam half 14 reflected at the thin-film polarizer 4 in that case is superimposed with the first transmitted beam half 12, in such a way that both component beams 12, 14 coincide and accordingly form a resultant beam 16.

The resultant beam 16 now has a beam cross section 18 which only still has substantially half the width b' in relation to the beam cross section 10 of the incident laser beam 1.

Moreover, the resultant laser beam 16 now comprises the p-polarized components from the first beam half 12 and the s-polarized components from the second beam half 14.

FIG. 2, comprising FIGS. 2A, 2B, 2C, and 2D, shows a further embodiment of the device 100 for beam shaping.

The incident, p-polarized laser beam 1 is incident on an edge 220 of the prism 2 and is once again split there into a first beam half 12 and a second beam half 14.

In this case, the prism 2 is geometrically designed and the laser beam 1 is aligned with respect to the prism 2 such that the first beam half 12 and the second beam half 14 are each incident at the Brewster angle B on a first incidence side 20 and a second incidence side 22, respectively, of the prism 2. Moreover, the incident laser beam 1 is aligned such that the first beam half 12 and the second beam half 14 have substantially the same beam cross-section.

Since the incident laser beam 1 is p-polarized in relation to the boundaries of the polarizer 2, it can be input coupled without losses into the prism 2 via the first incidence side 20 and the second incidence side 22.

Then, within the prism, the first beam half 12 is refracted in the direction of the first exit side 24 and is incident there on the first exit side 24 at the angle B' and re-emerges from the prism 2. The angle B' applies at the first exit side 24 to the first beam half 12 propagating within the prism 2.

In particular, this should be understood as meaning that the first incidence side 20 and the first exit side 24 may be arranged parallel to one another in this embodiment. The first beam half 12 which has re-emerged from the prism 2 subsequently has a parallel offset with respect to the incident first beam half 12.

Subsequently, the emerged first beam half 12 traverses a thin-film polarizer 4, wherein a 100% transmission through the thin-film polarizer 4 occurs here on account of the p-polarization of the first beam half 12. There can be a slight parallel offset of the resultant beam 16 emerging from the thin-film polarizer 4 on account of the thickness of said thin-film polarizer 4; this parallel offset is preferably already taken into account when designing the prism.

The second beam half 14 is refracted within the prism 2 in the direction of the prism base 28, at which the propagation direction of the second beam half 14 within the prism 2 is modified as a result of total-internal reflection. In the present embodiment, the prism base 28 extends parallel to the incident laser beam 1. Following the total-internal reflection at the prism base 28, the second beam half 14 is incident on the second exit side 26 at the angle B' and accordingly emerges from the prism 2 at the Brewster angle.

Subsequently, the emerged second beam half 14 traverses a half-wave plate 3, where its polarization is rotated such that the second beam half downstream of the half-wave plate has an s-polarization.

In this example, the geometry of the prism 2 is chosen such that the now s-polarized second beam half 14 is subsequently incident on the thin-film polarizer at the Brewster angle B and 100% thereof is reflected there.

In particular, the geometry of the prism 2 and the arrangement of the thin-film polarizer 4 are chosen such that the two component beams 12, 14 coincide and accordingly form a resultant beam 16.

The resultant beam 16 now once again has a beam cross section 18 which only still has substantially half the width b' in relation to the beam cross section 10 of the incident laser beam 1.

Moreover, the resultant laser beam 16 now comprises the p-polarized components from the first beam half 12 and the s-polarized components from the second beam half 14.

Figure 3A:
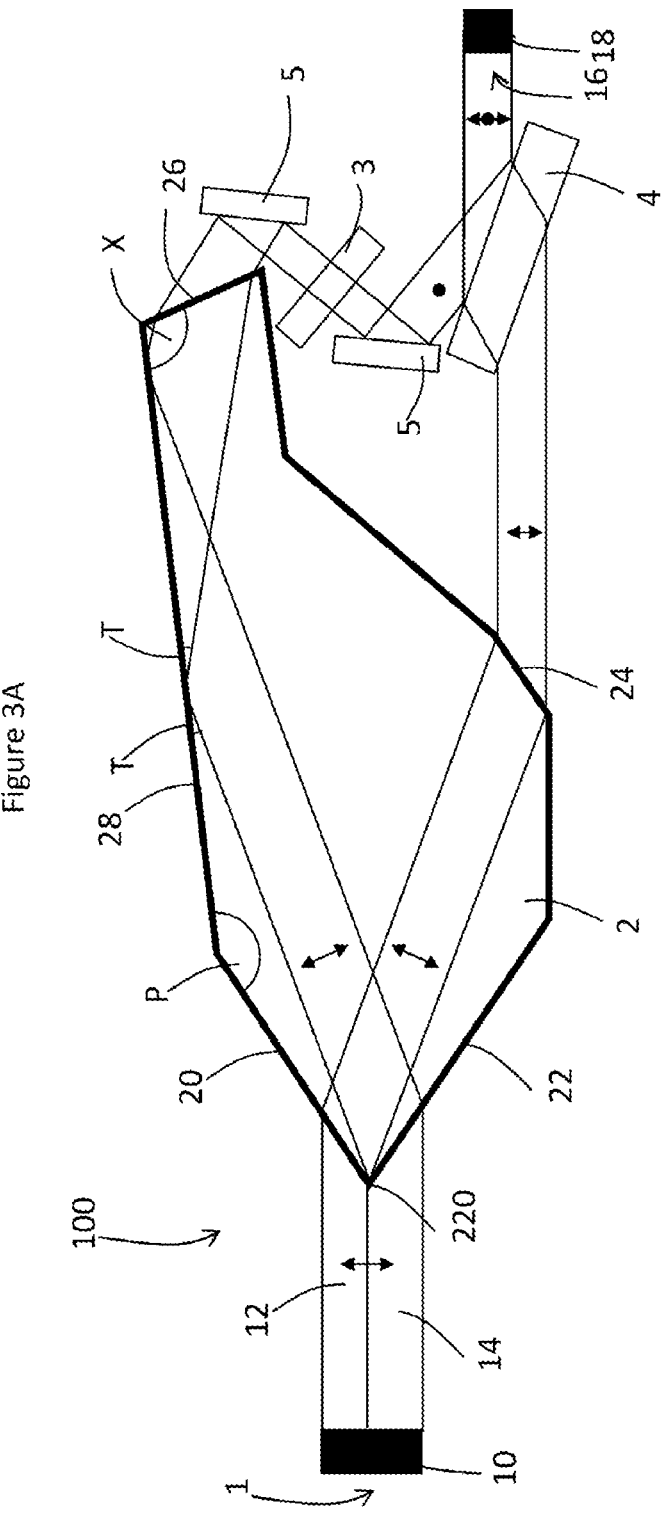
FIG. 3A shows a schematic illustration of yet a further device for beam shaping, and of the beam path through the device, according to some embodiments.
Figure 3B:
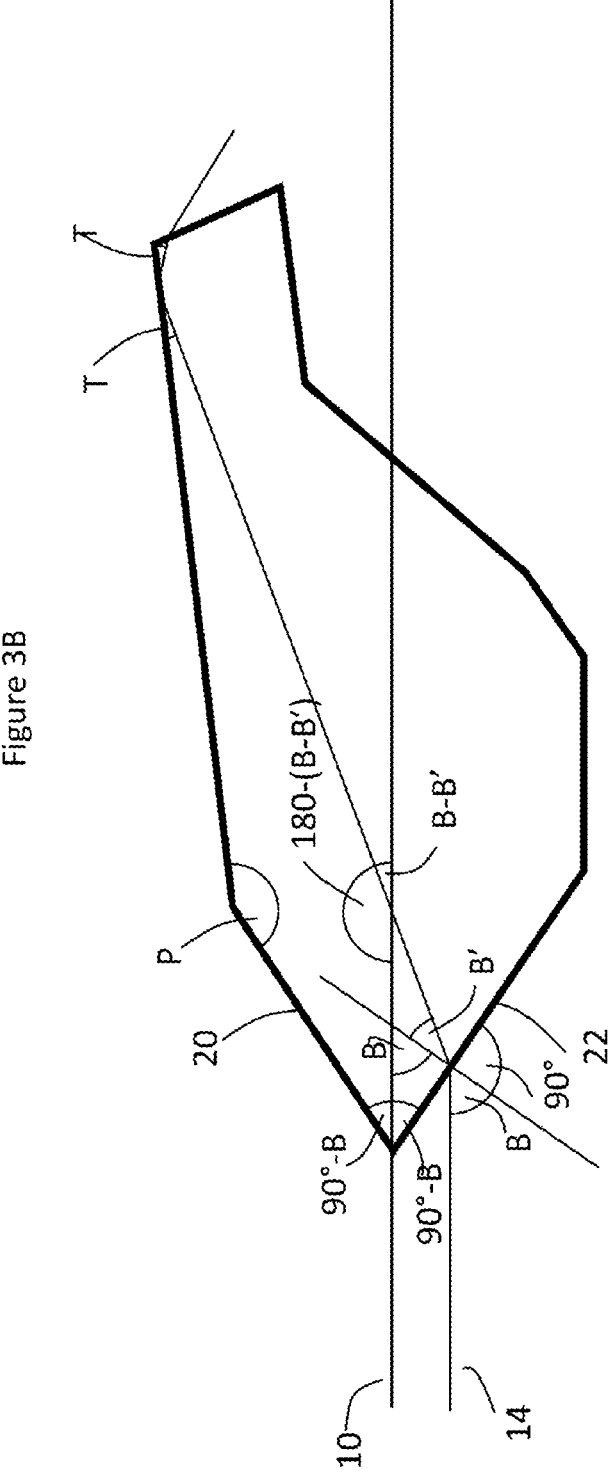
FIG. 3B shows a schematic illustration of the beam path according to the yet further embodiment for illustrating the prism angles.
Figure 3C:
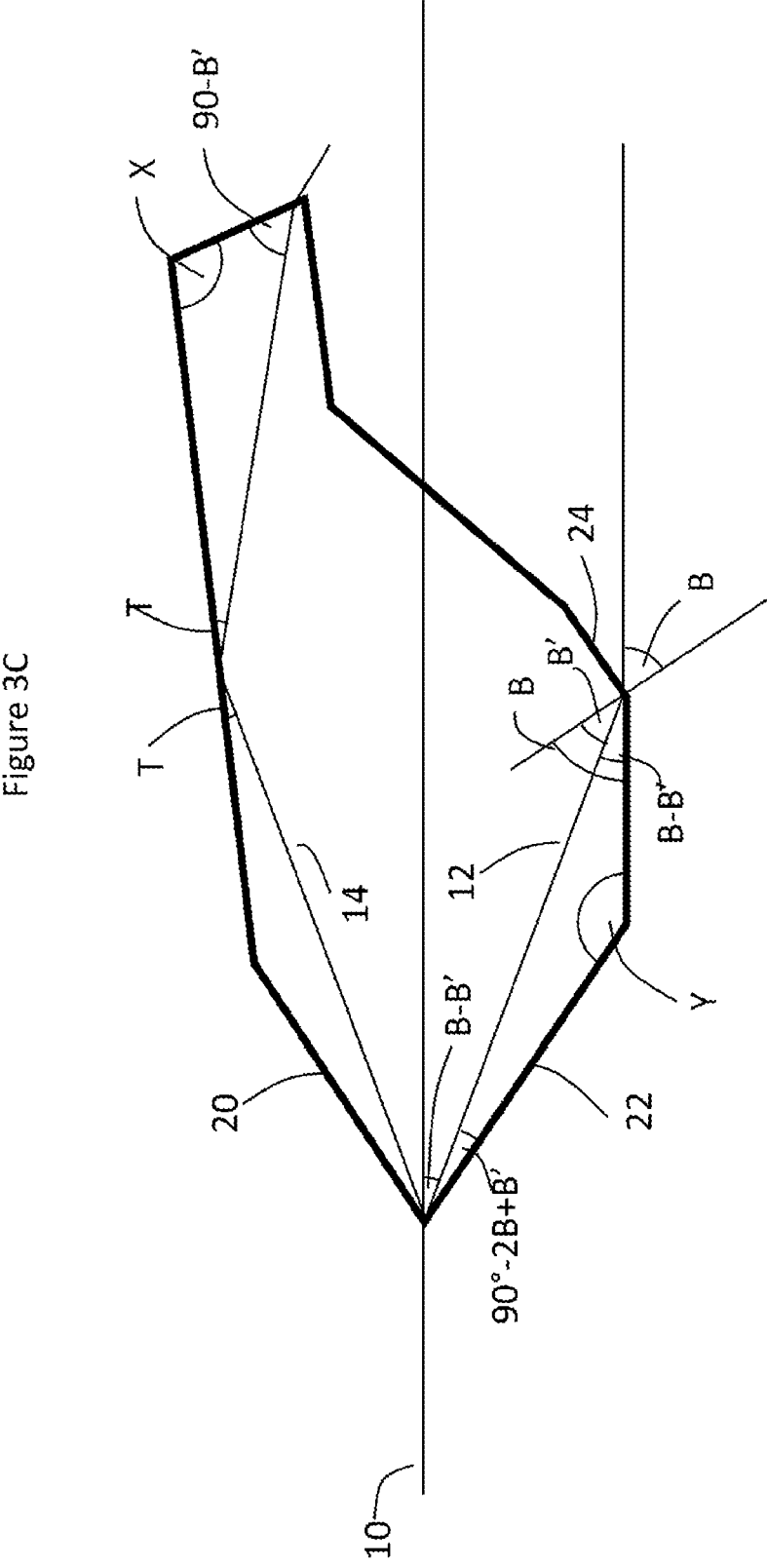
FIG. 3C shows a schematic illustration of the beam path according to the yet further embodiment for illustrating the prism angles.

FIG. 3, comprising FIGS. 3A, 3B, and 3C, shows yet a further embodiment of the device 100 for beam shaping.

In a manner analogous to FIG. 2, the incident, p-polarized laser beam 1 is decomposed into a first beam half 12 and a second beam half 14 as a result of striking the prism 2. In this case, the beam path of the first beam half 12 is identical to that of FIG. 2.

However, the beam path of the second beam half 14 differs from that of FIG. 2. The second beam half 14 is also refracted in the direction of the prism base 28 following the entrance into the prism 2. However, the prism base 28 does not extend parallel to the incident laser beam 10 since the prism angle P is greater than in the previous example.

However, the second beam half 14 also experiences a total-internal reflection at the prism base 28 in this exemplary embodiment since the angle of reflection T at the prism base 28 is smaller than in the embodiment of FIG. 2, and so the condition for total-internal reflection is still satisfied. However, since the second beam half 14 should also emerge from the prism 2 satisfying the Brewster condition, the prism angle X, which the first exit face 26 includes with the prism base 28, is larger in comparison with the embodiment in FIG. 2.

The second beam half 14 leaves the prism 2 at the Brewster angle B and is incident on a first mirror 5, which reflects the second beam half 14 in the direction of a polarization rotator 3. There, the polarization direction of the second beam half 14 is converted into an s-polarization. Downstream of the polarization rotator 3, the second beam half 14 is reflected by a further mirror 5 in the direction of the thin-film polarizer 4. There, the first beam half 12 is transmitted through the thin-film polarizer 4 and the second beam half 14, on account of its s-polarization, is reflected in full by the thin-film polarizer.

In a manner analogous to the previous embodiments, the two beam halves 12, 14 are preferably congruently superimposed as a result, and so the beam profile 18 of the resultant beam 16 is smaller than the beam profile 10 of the incident laser beam 1.

Various angle relationships, which are of importance to this embodiment, arise from FIG. 3B. For reasons of clarity, only the lower beam delimitation of the second beam half 14 is shown.

The starting point of the illustration here is the incident laser beam 1, which defines the horizontal in relation to which the angles in the system are specified. In the embodiment, the first incidence side 20 and the second incidence side 22 are arranged at an angle of 90°–B with respect to the incident laser beam 1.

The second beam half 14 is incident on the second incidence side 22 at the Brewster angle B relative to the surface normal and refracted toward the surface normal at the angle B'. In the prism 2, the second beam half 14 runs at an angle of B—B' relative to the horizontal and finally undergoes total-internal reflection at the angle T on the prism base 28.

The angle T emerges from the opening angle of the prism 90°–B, the prism angle P, and the angle of the second beam half 14 with respect to the horizontal, by way of the following relationship: $360°=[90°–B]+[P]+[T]+[180°–(B–B')]$, and hence $T=90°+2B–B'–P$.

In the equation above, the relevant angles of the system were combined in square brackets. In particular, T needs to be smaller than the angle of total-internal reflection so that the second beam half 14 undergoes total-internal reflection at the prism base 28. However, it should be observed that a flatter angle of incidence than the angle of total-internal reflection also leads to total-internal reflection, and so the angle of total-internal reflection which arises from the refractive indices of the prism 2 and surrounding medium can only be considered to be an upper limit.

FIG. 3C shows further angle relationships of the prism 2, wherein for reasons of clarity only the upper beam limit of the second beam half 14 is shown. Since the second beam half 14 should be incident on the second exit surface 26 at the angle B', the prism angle X emerges by way of the following relationship: $180°=[T]+[X]+[90°–B']$. Since, as is shown above, the angle of reflection T depends on the prism angle P, the following relationship arises overall for the prism angle X: $X=P–2B$.

If the aforementioned angle relationships are observed, the second beam half 14 is incident on the second prism side 22 at the Brewster angle B and also emerges from the second exit surface 26 at the Brewster angle B. Moreover, the geometric external dimensions of the prism 2 also arise from the angle relationships.

The first beam half 12 is also shown in FIG. 3C, albeit only its lower beam delimitation for reasons of clarity. The first beam half 12 includes the angle 90°–2B+B' with the second prism side 22. Since the first beam half 12 should be incident on the first exit side 24 at the angle B' again, the prism angle Y arises by way of the relationship $180°=[90°–2B+B']+[Y]+[B—B']$, and hence $Y=90°+B$.

In the case of additional deflection mirrors, the angle of the thin-film polarizer is preferably independent of the design of the prism. In particular, the thin-film polarizer can be arranged such that the reflected beam with s-polarization is superimposed with the beam of p-polarization.

In particular, the polarization properties of the thin-film polarizer are specified by the thin-film stack, which can be optimized for different angles of incidence. Thus, depending on the design of the thin-film polarizer, the p-polarized beam may also be at a different angle with respect to the thin-film polarizer than the Brewster angle.

The angle relationships are also directly applicable to the embodiment shown in FIG. 2.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

List of Reference Signs

1 Incident laser beam
10 Beam cross section of the incident laser beam
12 First beam half
14 Second beam half
16 Resultant beam
18 Beam cross section of the resultant beam
2 Prism
20 First incidence side
22 Second incidence side
24 First exit side
26 Second exit side
28 Prism base
3 Polarization rotator
4 Thin-film polarizer
5 Mirror
X, P, Y Prism angles
T Angle of reflection

The invention claimed is:

1. A device for beam shaping of a laser beam, the device comprising a prism, a polarization rotator, and a thin-film polarizer,
the prism being arranged such that it splits an incident laser beam into a first beam half and a second beam half, with at least the first beam half being input coupled into the prism;
the first beam half entering the prism at a first incidence side, with the prism being configured such that the first incidence side is arranged at the Brewster angle vis-à-vis the incident laser beam,
the prism being configured such that the first beam half input coupled into the prism is output coupled from the prism at an exit side of the prism, with the first beam half being output coupled from the prism at the Brewster angle, with the thin-film polarizer being arranged such that it is traversed by the first beam half output coupled from the prism,
the polarization rotator being arranged such that it is traversed by the second beam half and rotates a polarization of the second beam half, and
the second beam half being guided such that it is reflected by the thin-film polarizer, and the thin-film polarizer superimposes the first beam half and the second beam half.

2. The device as claimed in claim 1, wherein the first exit side is at the Brewster angle with respect to the first beam half which is input coupled into the prism and incident on the first exit side,
with the thin-film polarizer being arranged such that it is traversed at the Brewster angle by the first beam half output coupled from the prism.

3. The device as claimed in claim 1, wherein the incident laser beam is p-polarized.

4. The device as claimed in claim 1, wherein the polarization rotator is attached to the prism and/or wherein the polarization rotator is a half-wave plate.

5. The device as claimed in claim 1, wherein the polarization rotator is configured such that the polarization of the second beam half is rotated through 90° into an s-polarization.

6. The device as claimed in claim 1, wherein the prism is configured such that at least one of the first beam half and the second beam half undergoes total-internal reflection within the prism.

7. The device as claimed in claim 1, further comprising at least one mirror, the at least one mirror reflecting the second beam half, following the traversal of the polarization rotator, at the thin-film polarizer.

8. The device as claimed in claim 7, wherein the at least one mirror and the prism are preassembled on a common base plate.

9. The device as claimed in claim 1, wherein the prism is arranged and configured such that the second beam half is input coupled into the prism at a second incidence side, the second incidence side being arranged at the Brewster angle vis-à-vis the incident laser beam.

10. The device as claimed in claim 9, wherein the prism is configured such that the second beam half is output coupled from the prism at a second exit side, the second exit side being arranged such that the second beam half is incident on the second exit side at the Brewster angle.

11. The device as claimed in claim 10, wherein the polarization rotator is arranged such that the second beam half output coupled from the prism traverses the polarization rotator.

12. The device as claimed in claim 1, wherein the second beam half does not enter the prism.

13. The device as claimed in claim 12, wherein the thin-film polarizer on the first exit side of the prism is realized by an optical coating.

14. The device as claimed in claim 12, wherein the prism is a Dove prism.

15. A method for the beam shaping of a laser beam by using a device, the device comprising a prism, a polarization rotator, and a thin-film polarizer, the method comprising:
dividing an incident laser beam into a first beam half and a second beam half by striking the incident laser beam on the prism;
causing the first beam half to be incident on a first entrance side of the prism at the Brewster angle, wherein the first beam half enters the prism, traverses the prism, and exits the prism at the Brewster angle, and wherein, following the traversal of the prism, the first beam half has a parallel offset from the incident laser beam;
following the exit from the prism, causing the first beam half to traverse the thin-film polarizer;
rotating a polarization of the second beam half by using the polarization rotator;
deflecting the second beam half in a direction of the thin-film polarizer by refraction and/or reflection;

reflecting the second beam half by using the thin-film polarizer; and superimposing the first beam half and the second beam half congruently downstream of the thin-film polarizer in a beam direction.

\* \* \* \* \*